United States Patent [19]
Kohmoto

[11] Patent Number: 4,645,310
[45] Date of Patent: Feb. 24, 1987

[54] ZOOM LENS WITH MACROMECHANISM

[75] Inventor: Shinsuke Kohmoto, Tokyo, Japan

[73] Assignee: Asahi Kokagu Kogyo Kabushiki Kaisha, Tokyo, Japan

[21] Appl. No.: 651,570

[22] Filed: Sep. 18, 1984

[30] Foreign Application Priority Data

Sep. 21, 1983 [JP] Japan .................. 58-174882

[51] Int. Cl.⁴ ................................. G02B 7/10
[52] U.S. Cl. ................................... 350/430
[58] Field of Search .................. 350/430, 429, 255

[56] References Cited

U.S. PATENT DOCUMENTS 4,421,389 12/1983 Muryoi ........................ 350/430
4,457,591 7/1984 Muryoi et al. ................ 350/430

Primary Examiner—John K. Corbin
Assistant Examiner—Loha Ben
Attorney, Agent, or Firm—Sughrue, Mion, Zinn, Macpeak and Seas

[57] ABSTRACT

A zoom lens in which a stop guide is located between an operating ring and a stationary lens barrel for regulating the range of rotation of the operating ring. A macrophotography guide permits, when the operating ring is positioned at the closest photographing distance and in the focusing rotation range and at at least one of the zooming movement ends, the operating ring to further turn for a closer photographing range. The stop guide includes a stop pin fixed to the operating ring and a stop plate having stop pin rotation range regulating surfaces on both sides in the circumferential direction of the zoom lens and which is secured to the stationary lens barrel. The plate has a macrophotography guide cut formed in at least one end portion located in the direction of the optical axis with the macrophotography guide cut being arranged circumferentially of the zoom lens.

3 Claims, 6 Drawing Figures

ZOOM LENS WITH MACROMECHANISM

BACKGROUND OF THE INVENTION

The present invention relates to zoom lenses, and more particularly to a zoom lens which has a simplified and improved macrophotographing function.

Recently, zoom lens having a so-called "macromechanism" permitting ordinary focusing distance photography and close-up or macro focusing distance photography (macrophotography) has been extensively employed. The conventional zoom lens with a macromechanism uses a special helicoid (helicol groove) in order to increase the amount of extension in the macrophotographing range, and therefore needs some way of switching between the special helicoid and the helicoid for ordinary focusing distance photography. Thus, the conventional zoom lens of this type is considerably intricate in construction and accordingly high in manufacturing cost.

Further, the closest focusing distance of a zoom lens is determined by the focusing distance in the zooming range where "vignetting" (insufficient quantity of surrounding light) occurs most significantly. At other focusing distances, the quantity of surrounding light is sufficient, and hence the closest focusing distance can be decreased. In general, the closest focusing distance is reduced at both ends of the zooming range, that is, the longest focus and the shortest focus positions.

SUMMARY OF THE INVENTION

In consideration of the above, the invention provides a zoom lens in which no special helicoid for macrophotography and means for switching between the special helicoid and the helicoid for ordinary focusing distance photography are used, and an extension mechanism for focusing the zoom lens is employed for closest focusing distance photography.

In a so-called "one-hand zoom lens" in which focusing is carried out by rotating an operating ring supported on the stationary lens barrel of the zoom lens while zooming is achieved by moving the operating ring along the optical axis, according to the invention, a stop guide located between the operating ring and the stationary lens barrel in order to regulate the range of rotation of the operating ring is provided with a macrophotography guide which, when the operating ring is positioned at the closest photographing distance end in the focusing rotation range and at at least one of the zooming movement ends, permits the operating ring to further turn for a closer photographing range. This is, only when the operating ring is at the shortest focal length and/or longest focal length and at the closest photographing position is the operating ring allowed to further turn for a closer photographing range, thereby to permit macrophotography.

DESCRIPTION OF THE PREFERRED EMBODIMENTS

Figure 1:
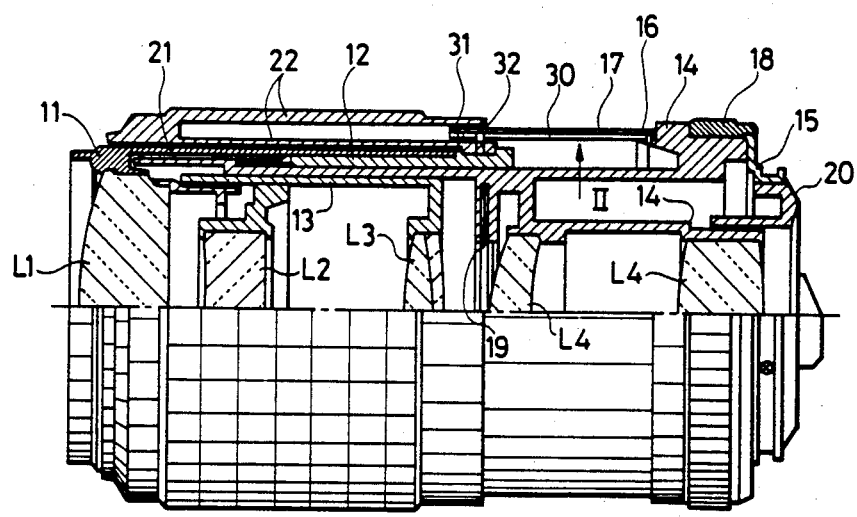
FIG. 1 is a front view, with the upper half in cross section, showing a first example of a zoom lens according to the invention.
Figure 2:
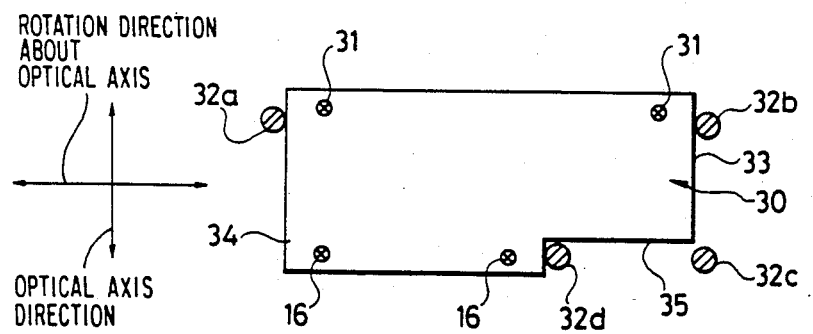
FIG. 2 is an unfolded diagram of a stop plate as viewed in the direction of an arrow II in FIG. 1.

The invention will now be described with reference to preferred embodiments thereof. FIGS. 1 and 2 show a first preferred embodiment of a zoom lens of the invention. The optical system of the zoom lens includes a focusing lens group L1, a variator lens group L2, a compensator lens group L3, and a master lens group L4 arranged in the stated order from the left (front) side in FIG. 1. The lens groups L1, L2, L3 and L4 are held by a focusing lens group frame 11, a variator frame 12, a compensator frame 13 and a stationary lens barrel 14, respectively. The stationary lens barrel 14 has a mount 15 at the rear end which is used to mount the zoom lens on the camera body. A focusing distance scale ring 17 is secured to the stationary lens barrel 14 with a small screw 16, thus forming a part of the stationary lens barrel. An aperture scale ring 18 is rotatably supported on the stationary lens barrel 14, being interlocked with an aperture mechanism 19 provided in the stationary lens barrel 14. A protective ring 20 is secured to the inside of the mount 15.

The focusing lens group frame 11 is engaged with the stationary lens barrel 14 through a helicoid 21. As the focusing lens group frame 11 is turned, it is moved along the optical axis guided by the helicoid 21. An operating ring 22 is supported so that it is moved together with the variator frame 12 in the direction of the optical axis and is rotatable with respect to the variator frame 12. The variator frame 12 is supported on the stationary lens barrel 14 in such a manner that it is movable straightly only along the optical axis. As the variator frame 12 is moved straightly, the compensator frame 13 is moved along the optical axis through a cam mechanism while maintaining a predetermined relation with respect to the variator frame 12. Accordingly, as the operating ring 22 is moved straightly along the optical axis, the lens groups L1, L2 and L3 are moved along the optical axis while maintaining predetermined relations therebetween, thus changing the focusing distance. Thus, focusing can be achieved by rotating the operating ring 22, and zooming by moving it along the optical axis.

So far there has been described a conventional so-called "one-hand zoom lens", a variety of constructions of which have been well known in the art. Therefore, a further detailed description of the above-mentioned components will be omitted.

In the first embodiment of the invention, a stop plate 30 for regulating the range of rotation of the operating ring 22 is improved to allow macrophotography. The stop plate 30 is fixedly secured to the inner surface of the focal length scale ring 17 with the aforementioned small screws 16 and other small screws 31. A stop pin 32 for engaging with the stop plate 30 is fixed to the operating ring 22.

FIG. 2 is an unfolded diagram showing the stop plate 30. The stop plate 30 has a rotation range regulating surface 33 provided on the closest photographing distance side and a rotation range regulating surface 34 on the infinity photographing side. The rotation range regulating surfaces 33 and 34 serve as straight movement guide surfaces when, at the closest or longest photographing distance position, the operating ring 22 is moved straightly along the optical axis for zooming. A macrophotography guide cut 35, which extends circumferentially in continuity with the rotation range regulating surface 33 provided on the shortest photographing side, is formed in one end portion of the stop plate on the side where the stop pin 32 is positioned when the operating ring 22 is set for the longest focusing distance. This is a specific feature of the stop plate 30.

Accordingly, as in the conventional zoom lens, the zoom lens thus constructed can be focused on the object by freely rotating the operating ring 22 in the range of rotation where the stop pin 32 abuts against the rotation range regulating surfaces 33 and 34. Furthermore, when the stop pin 32 moves into the macrophotography guide cut 35 after the shortest focusing distance has been obtained by zooming, macrophotographing beyond the closest photographing distance can be achieved.

In FIG. 2, 32a, 32b, 32c and 32d designate the positions of the stop pin 32 when the operating ring 22 is set at the infinity photographing position on the short focal length side, at the closest photographing position on the short focal length side, at the closest photographing position on the long focal length side, and at the closest photographing position at the time of macrophotography, respectively.

In the above-described zoom lens, in order to permit macrophotography at the end on the long focusing distance side, the macrophotography guide cut 35 is formed in the end portion of the stop plate 30 on the rear side as viewed in the direction of the optical axis. However, depending on the focus adjustment range of the zoom lens, the cut may be formed in the other end portion of the stop plate, that is, the end portion which is on the front side as viewed in the direction of the optical axis. Furthermore, two macrophotography guide cuts may be formed in the end portions on both the long and short focusing distance sides so as to permit the macrophotographing operating at both ends of zooming movement.

Figure 3:
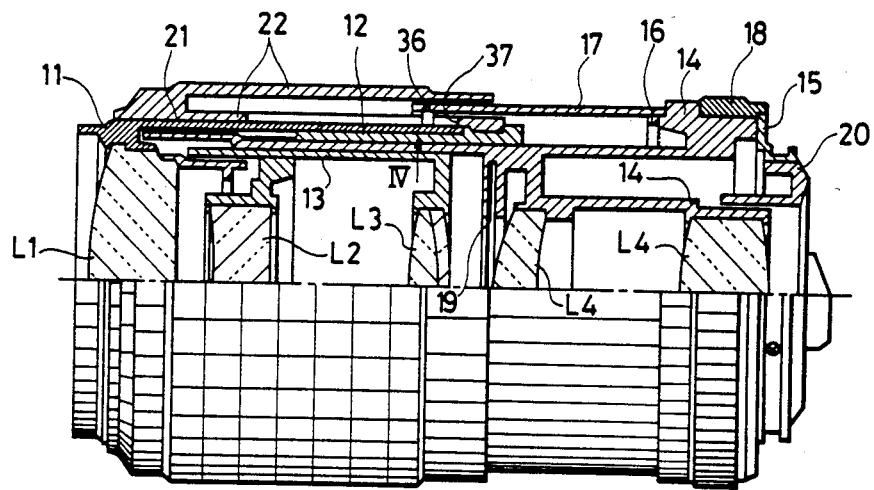
FIG. 3 is a front view, with the upper half in cross section, showing a second example of a zoom lens according to the invention.
Figure 4:
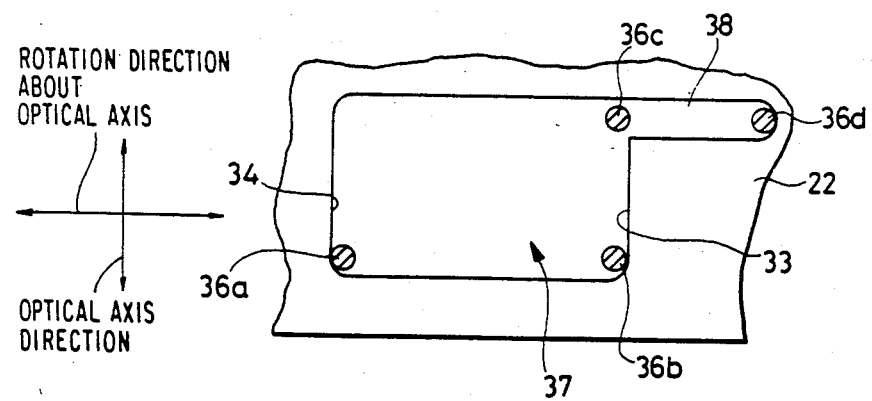
FIG. 4 is an unfolded diagram of a stop window as viewed in the direction of the arrow IV in FIG. 3.

The zoom lens of the invention can be modified in various ways. FIGS. 3 and 4 show a second embodiment of the invention in which a stop pin 36 is fixed to the focal length scale ring 17 (or the stationary lens barrel 14), and a stop window 37 with rotation range regulating surfaces 33 and 34 which are brought into engagement with the stop pin 36 is formed in the operating ring 22. In the second embodiment, the macrophotography guide is in the form of a groove 38 which extends circumferentially from the end of the stop window 37 located on the short focusing distance side. Other components are similar to those of the first embodiment, and are thus designated by the same reference numerals. The second embodiment has the same effects as the first embodiment. In FIG. 4, 36a, 36b, 36c, and 36d correspond to 32a, 32b, 32c and 32d, respectively.

Figure 5:
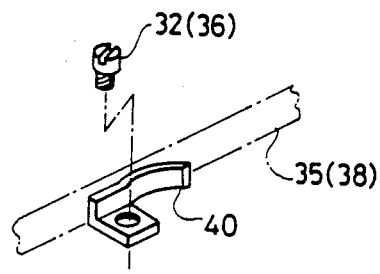
FIGS. 5 and 6 are perspective views showing examples of a stop pin with a friction increasing arrangement.
Figure 6:
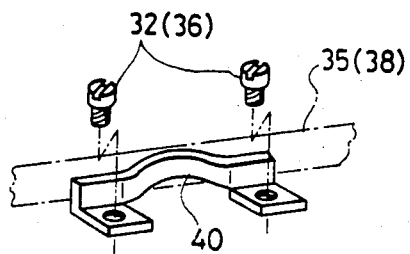

FIGS. 5 and 6 show other embodiments of the invention in which, in order to allow the photographer to sense the difference between operating in the macrophotographing range and operating in the ordinary photographing range, the stop pin 32 (FIG. 5) or stop pins 32 or 36 (FIG. 6) secure a friction spring 40 which increases the friction for rotation when in elastic abutment against the circumferentially extended wall of the macrophotography guide cut 35 or the macrophotography guide groove 38. In these embodiments, the resistance for rotation of the operating ring 22 in the photographing operation in the macrophotographing range is larger than the resistance for rotation of the operating ring in the photographing operation in the ordinary photographing range, and therefore the photographer can tactiley sense when the photographing operation is being performed in the macrophotographing range. The same effect can be obtained by a friction increasing structure such as a leaf spring provided on the circumferential wall of the macrophotography guide cut 35 or the macrophotography guide groove 38 in such a manner as to elastically contact the stop pin 32 or 36. It should be noted that, in the case of FIG. 5, the stop pin on the closest photographing distance side or the infinity photographing side should be provided in addition to the stop pin 32 or 36.

As is apparent from the above description, according to the zoom lens of the invention, a macrophotographing operation can be achieved with a considerably simple arrangement including a stop guide for controlling the rotation of an operating ring having a macrophotographing guide by which, after the operating ring of the so-called "one-hand zoom lens" has been turned for the shortest or longest focusing distance, the operating ring is permitted to further turn for a closer distance. Accordingly, the invention provides a zoom lens which, unlike the conventional zoom lens of this type, needs no special helicoid for the macromechanism and no mechanism for switching between helicoids, and thus is considerably practical and low in manufacturing cost.

I claim:

1. In a zoom lens with a macromechanism in which a single operating ring is supported on a stationary lens barrel in such a manner that said operating ring is rotatable along a helicoid and movable along an optical axis of said zoom lens, a stop guide for regulating the focusing rotation range of said operating ring is provided between said stationary lens barrel and said operating ring, and zooming is achieved by moving said operating ring along said optical axis while focusing is achieved by rotating said operating ring, the improvement wherein:

a macrophotography guide is provided for said stop guide, which, when said operating ring is at the closest photographing distance end of said focusing rotation range and at an end corresponding to either the shortest or longest focal length linear extension range, permits said operating ring to further rotate for a closer photographing range, and said stop guide comprises:

a stop pin fixed to said operating ring, and a stop plate having stop pin rotation range regulating surfaces on both sides in a circumferential direction of said zoom lens and which is fixedly secured to said stationary lens barrel, said stop plate having a macrophotography guide cut for increasing a range of rotation of said stop pin for a closer photographing distance formed in at least one end portion of said stop plate located in a direction of said optical axis with said macrophotography guide cut being arranged circumferentially of said zoom lens, and friction means for, when said stop pin moves relative to said macrophotography guide cut and along said macrophotography guide cut, increasing an amount of friction for rotation thereof.

2. In a zoom lens with a macromechanism in which a single operating ring is supported on a stationary lens barrel in such a manner that said operating ring is rotatable along a helicoid and movable along an optical axis of said zoom lens, a stop guide for regulating the focusing rotation range of said operating ring is provided between said stationary lens barrel and said operating ring, and zooming is achieved by moving said operating ring along said optical axis while focusing is achieved by rotating said operating ring, the improvement wherein:
- a macrophotography guide is provided for said stop guide, which, when said operating ring is at the closest photographing distance end of said focusing rotation range and at an end corresponding to either the shortest or longest focal length linear extension range, permits said operating ring to further rotate for a closer photographing range, and said stop guide comprises:
- a stop pin fixed in said stationary lens barrel, and a stop window having stop pin rotation range regulating surfaces on both sides in a circumferential direction of said zoom lens and being cut in said operating ring, a macrophotography guide groove for increasing a range of rotation of said stop pin for a closer photographing distance extending circumferentially from at least one end of said stop window located in a direction of said optical axis.

3. The zoom lens with a macromechanism as claimed in claim 2, further comprising friction means for, when said stop pin moves relative to said macrophotography guide groove and along said macrophotography guide groove, increasing an amount of friction for rotation thereof.

* * * * *